(12) United States Patent
Wright et al.

(10) Patent No.: US 8,276,616 B2
(45) Date of Patent: Oct. 2, 2012

(54) HIGH PRESSURE DUCKBILL VALVE AND INSERT

(75) Inventors: Peter Wright, Irvine, CA (US); Robert J. Romero, Anaheim, CA (US); David L. Phillips, Santa Ana, CA (US)

(73) Assignee: Xylem IP Holdings LLC, White Plains, NY (US)

( * ) Notice: Subject to any disclaimer, the term of this patent is extended or adjusted under 35 U.S.C. 154(b) by 183 days.

(21) Appl. No.: 12/723,975

(22) Filed: Mar. 15, 2010

(65) Prior Publication Data

US 2011/0108139 A1 May 12, 2011

Related U.S. Application Data

(60) Provisional application No. 61/161,858, filed on Mar. 20, 2009.

(51) Int. Cl.
*F16K 15/14* (2006.01)

(52) U.S. Cl. .................... 137/850; 137/846

(58) Field of Classification Search ............ 137/512.15, 137/846, 849, 850, 847; 604/167.06
See application file for complete search history.

(56) References Cited

U.S. PATENT DOCUMENTS

| | | | | |
|---|---|---|---|---|
| 2,328,948 A | * | 9/1943 | Bourke | 217/103 |
| 2,417,968 A | * | 3/1947 | Browne | 137/850 |
| 2,990,849 A | * | 7/1961 | Peras | 137/515.7 |
| 3,334,646 A | * | 8/1967 | Billeter et al. | 137/218 |
| 4,540,349 A | | 9/1985 | Du | |
| 4,566,493 A | | 1/1986 | Edwards et al. | |
| 4,948,092 A | | 8/1990 | Kasper et al. | |
| 5,010,925 A | | 4/1991 | Atkinson et al. | |
| 5,664,940 A | | 9/1997 | Du | |
| 5,667,105 A | | 9/1997 | Hartley et al. | |
| 5,897,828 A | | 4/1999 | Sillince et al. | |
| 6,048,183 A | | 4/2000 | Meza et al. | |
| 6,053,194 A | | 4/2000 | Nelson et al. | |
| 6,089,260 A | | 7/2000 | Jaworski et al. | |
| 6,623,245 B2 | | 9/2003 | Meza et al. | |
| 6,702,255 B2 | | 3/2004 | Dehdashtian | |
| 6,953,059 B2 | | 10/2005 | Raftis | |
| 7,021,571 B1 | | 4/2006 | Lawson et al. | |
| 7,037,303 B2 | | 5/2006 | Beaufore et al. | |
| 7,083,392 B2 | | 8/2006 | Meza et al. | |
| 7,228,789 B1 | | 6/2007 | Mondszein et al. | |
| 7,296,782 B2 | | 11/2007 | Enerson et al. | |

(Continued)

FOREIGN PATENT DOCUMENTS

CA 2409009 5/2001

(Continued)

OTHER PUBLICATIONS

3 Pages PCT/US2010/027377 International Search Report mailed Nov. 4, 2010.

(Continued)

*Primary Examiner* — Kevin Lee
*Assistant Examiner* — Macade Brown

(57) ABSTRACT

The present invention provides apparatus featuring a check valve featuring a duckbill valve configured to provide fluid and particulate; and an insert having a base portion configured to seat the insert inside the duckbill valve, and a W-shaped portion configured with an opening to pass the fluid and particulate through the duckbill valve and also configured to provide support for walls of the duckbill valve in response to back pressure caused by the fluid and particulate.

20 Claims, 7 Drawing Sheets

Exploded view of duckbill check valve assembly

U.S. PATENT DOCUMENTS

| | | |
|---|---|---|
| 7,371,045 B2 | 5/2008 | Patel et al. |
| 7,378,058 B2 | 5/2008 | Lemme et al. |
| 7,390,316 B2 | 6/2008 | McFarlane |
| 7,491,321 B1 | 2/2009 | Maas et al. |
| 2004/0074393 A1 | 4/2004 | Minard et al. |
| 2005/0178804 A1 | 8/2005 | Renfrew et al. |
| 2005/0242204 A1 | 11/2005 | Ness et al. |
| 2006/0204367 A1 | 9/2006 | Meza et al. |
| 2007/0086888 A1 | 4/2007 | Patel et al. |
| 2007/0151992 A1 | 7/2007 | Carlson et al. |
| 2007/0184775 A1 | 8/2007 | Perkins et al. |
| 2007/0232952 A1 | 10/2007 | Baddour |
| 2007/0244426 A1 | 10/2007 | Hart et al. |
| 2008/0003120 A1 | 1/2008 | Meza |
| 2008/0061089 A1 | 3/2008 | Wellman |
| 2008/0152508 A1 | 6/2008 | Meza et al. |
| 2008/0160371 A1 | 7/2008 | Spahr et al. |
| 2008/0181786 A1 | 7/2008 | Meza et al. |
| 2008/0181788 A1 | 7/2008 | Meza et al. |
| 2008/0181790 A1 | 7/2008 | Meza et al. |
| 2010/0021312 A1 | 1/2010 | Meza |

FOREIGN PATENT DOCUMENTS

| | | |
|---|---|---|
| CN | 21145067 | 11/2008 |
| EP | 1333287 | 6/2003 |
| EP | 1520541 | 6/2005 |
| JP | 3204511 | 9/1991 |
| WO | 0064513 | 11/2000 |
| WO | 0149455 | 7/2001 |
| WO | 0192652 | 12/2001 |
| WO | 2005058186 | 6/2005 |
| WO | 2005082031 | 9/2005 |
| WO | 2007065131 | 6/2007 |
| WO | 2007075302 | 7/2007 |
| WO | 2008134808 | 11/2008 |

OTHER PUBLICATIONS

English Language Translation of JP3204511 Abstract, Mar. 16, 2009.

English Language Translation of CN201145067 Abstract, Mar. 16, 2009.

* cited by examiner

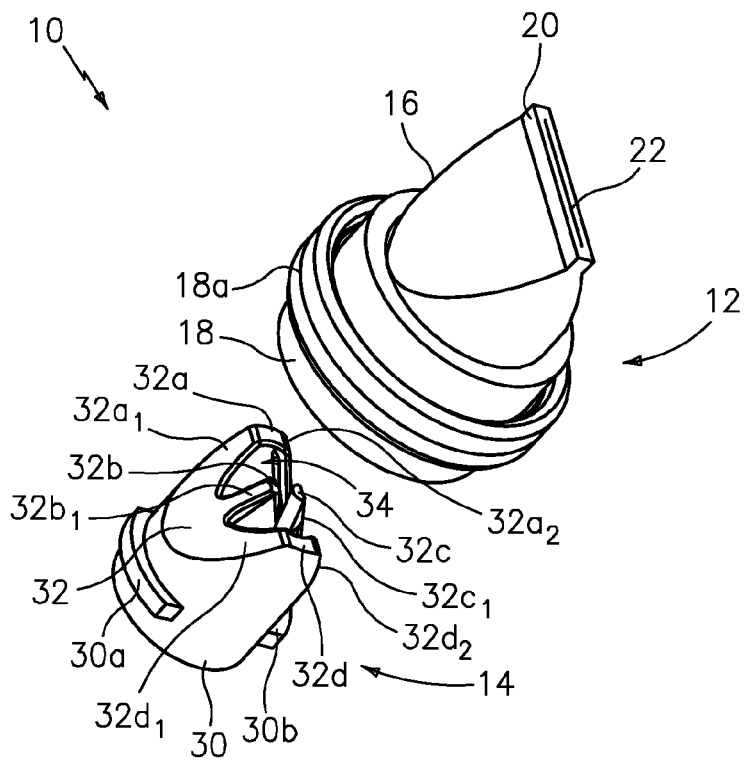
FIG. 1a : Exploded view of duckbill check valve assembly
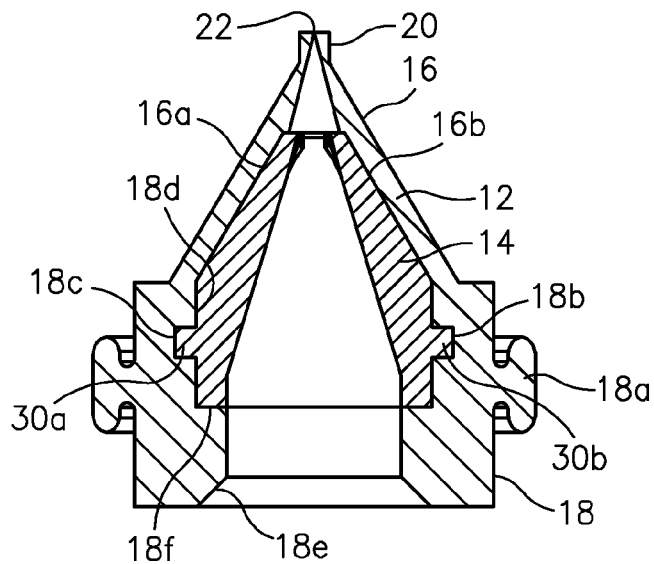
FIG. 1b : Cross-section of duckbill check valve assembly

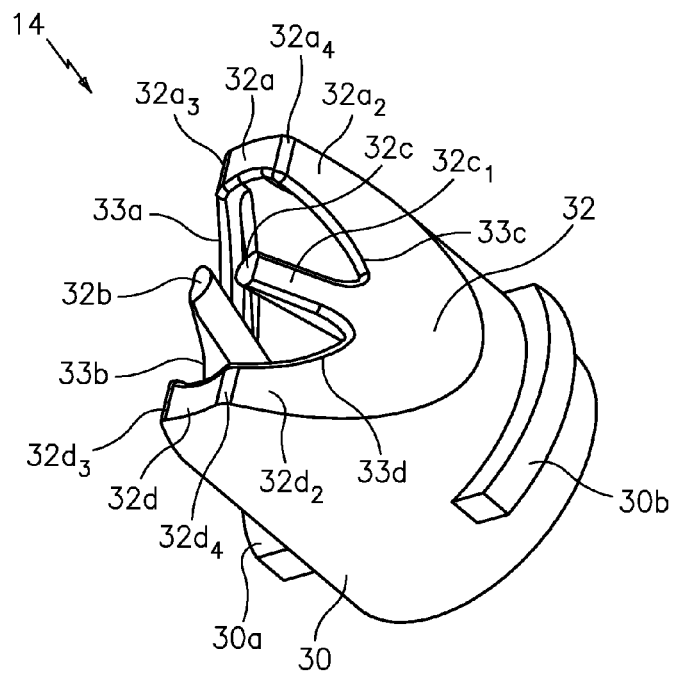
FIG. 2a : Top perspective view of duckbill check valve support
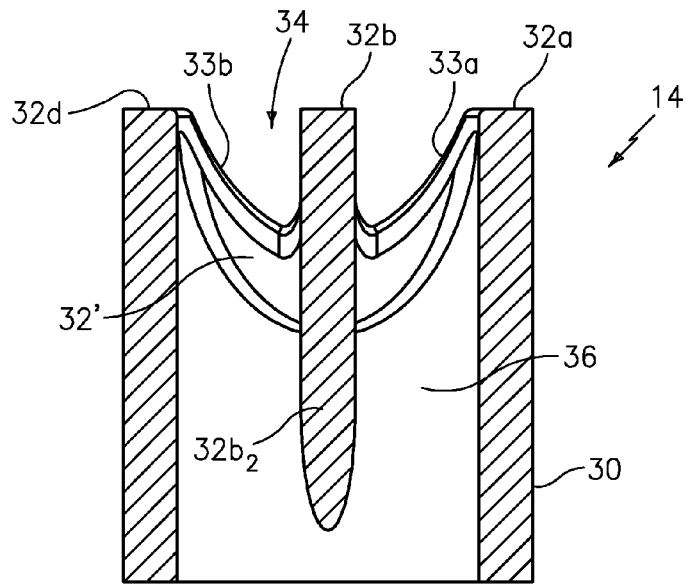
FIG. 2b : Cross-section of duckbill check valve support

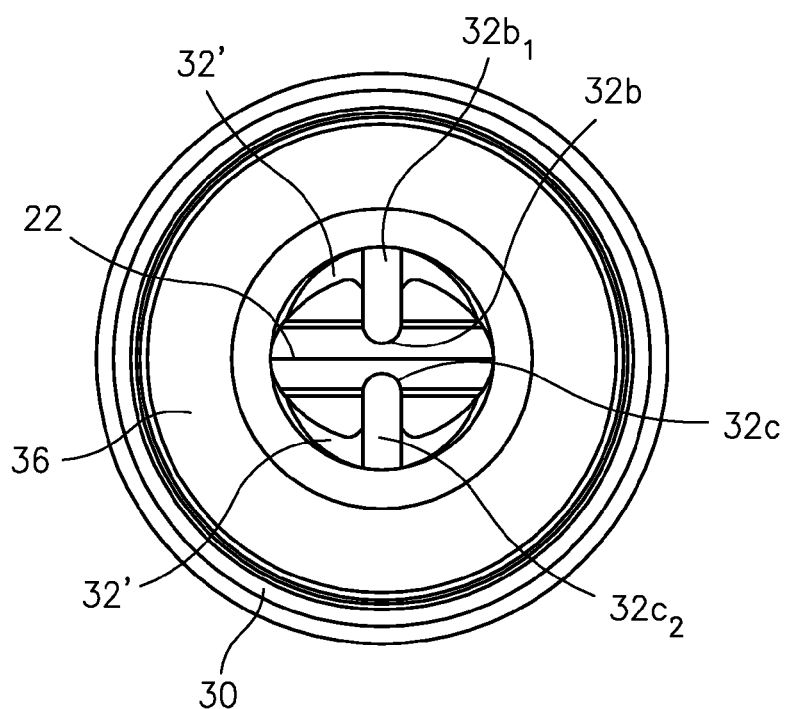
FIG. 2c : Bottom view of duckbill check valve support

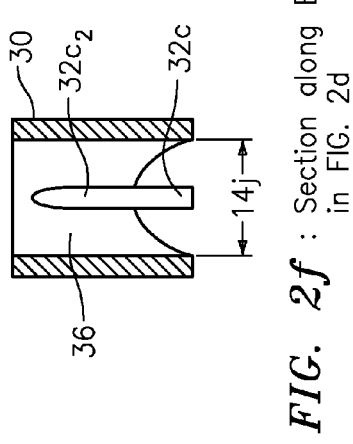
FIG. 2f: Section along B-B in FIG. 2d
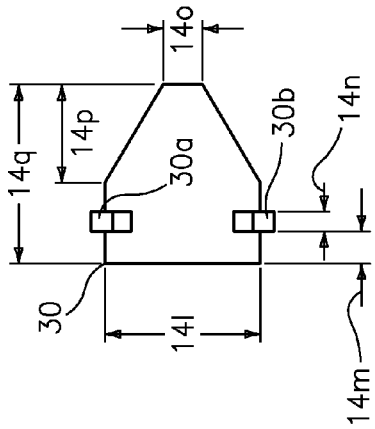
FIG. 2e: Section along A-A in FIG. 2d
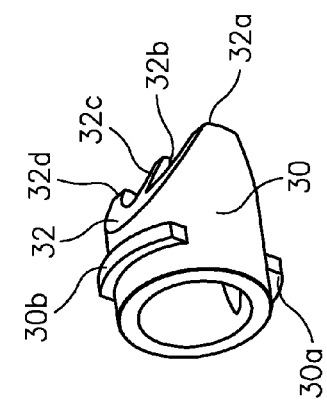
FIG. 2i: Side view along A-A in FIG. 2d of duckbill check valve support
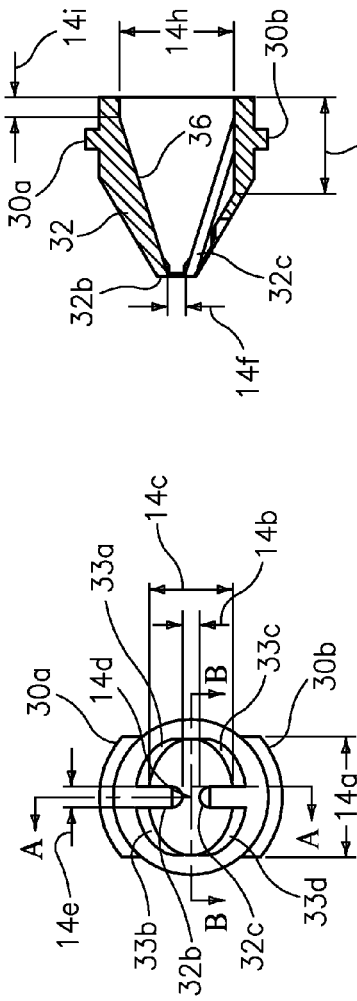
FIG. 2d: Top view of duckbill check valve support
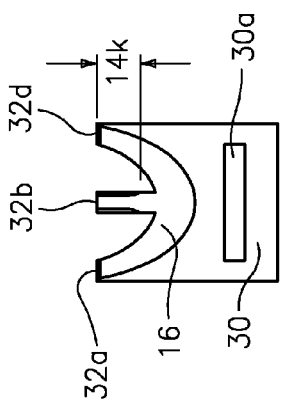
FIG. 2h: Side perspective view of duckbill check valve support
FIG. 2g: Side view along B-B in FIG. 2d of duckbill check valve support

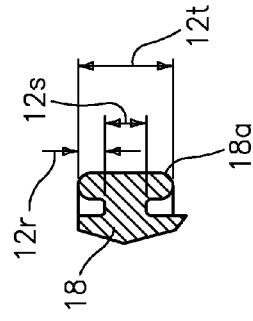
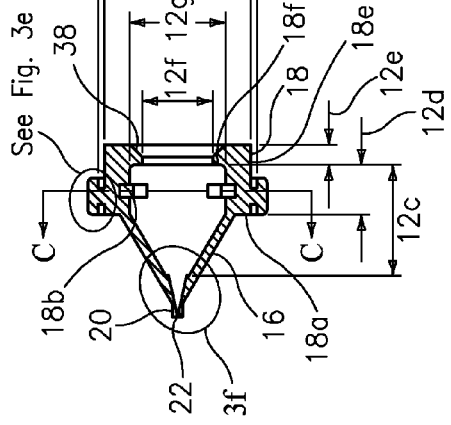
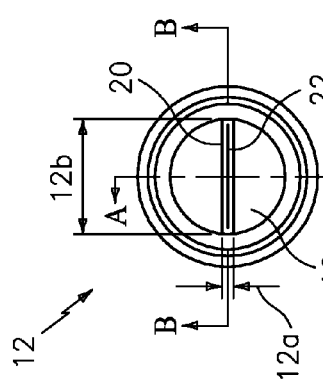
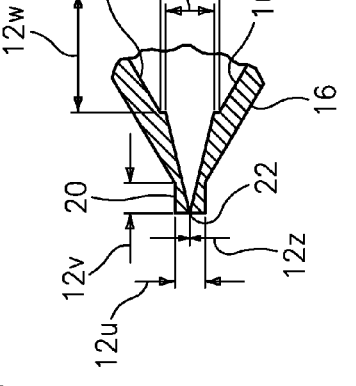
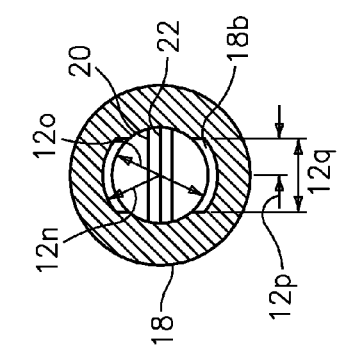
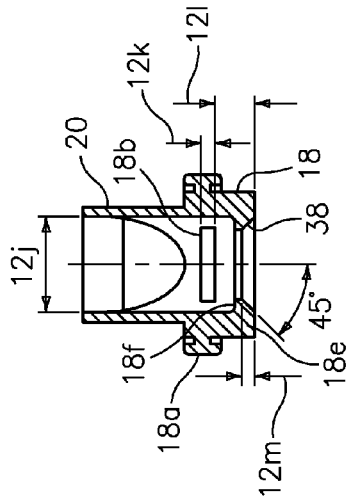
FIG. 3a: Top view of duckbill check valve seat
FIG. 3b: Section along A-A in FIG. 3a
FIG. 3c: Section along B-B in FIG. 3a
FIG. 3d: Section along C-C in FIG. 3b
FIG. 3e: Detailed view of portion D in FIG. 3b of duckbill check valve seat
FIG. 3f: Detailed view of portion E in FIG. 3b of duckbill check valve seat

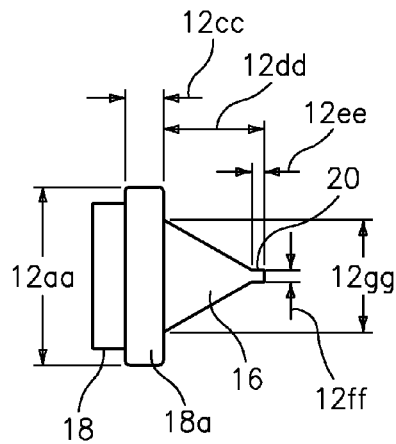
FIG. 3g : Side view along A-A in FIG. 3a of duckbill check valve seat
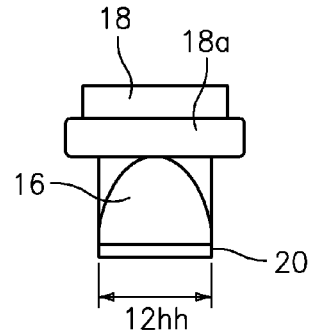
FIG. 3h : Side view along B-B in FIG. 3a of duckbill check valve seat
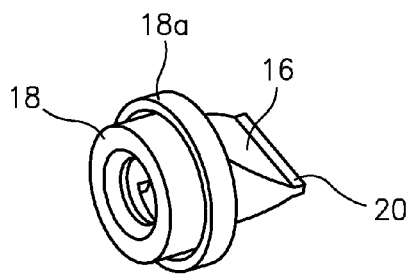
FIG. 3i : Side perspective view of duckbill check valve seat
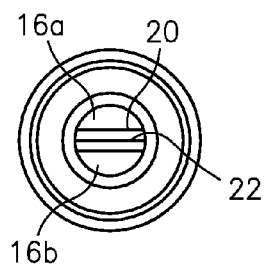
FIG. 3j : Bottom view of duckbill check valve seat

HIGH PRESSURE DUCKBILL VALVE AND INSERT

CROSS-REFERENCE TO RELATED APPLICATIONS

This application claims benefit to provisional patent application Ser. No. 61/161,858, filed 20 Mar. 2009, which is hereby incorporated by reference in its entirety.

BACKGROUND OF THE INVENTION

1. Field of the Invention

The present invention relates to a check valve for providing fluid and particulate; and more particularly relates to an insert for a check valve having a duckbill valve for providing fluid and particulate.

2. Brief Description of Related Art

In general, a duckbill valve is known as a valve, manufactured from pliable material, e.g., rubber or synthetic elastomer, and shaped like the beak of a duck. It is commonly used in medical applications to prevent contamination due to backflow. Typically, one end of the duckbill valve is configured to stretch over the outlet of a supply line, conforming itself to the shape of the line, usually round. The other end of the duckbill valve has walls that converge so as to form a flattened end with a slit configured to flex and open. When a fluid is pumped through the supply line and therefore the duckbill valve, the flattened end opens to permit the pressurized fluid to pass. When pressure is removed, however, the duckbill end returns to its flattened shape, preventing backflow. The duckbill valve is similar in function to the mitral valve in the heart. There are many duckbill valves available on the market but none known to the inventors so far that can handle higher than 20 PSI back pressure and large particulates at the same time.

A duckbill valve is known having a rigid support for inserting inside a valve seat. One end of the valve seat has walls that converge so as to form a flattened end with a slit. The rigid support has corresponding walls that also converge so as to form a rectangular opening to pass the fluid and particulates to the valve seat. The rectangular opening is dimensioned with a width of about 3.0 millimeters and length of about 10.0 millimeters to pass particulates that may be the size of about 3.0 millimeters, which is substantially equal to the width.

A patent search was also conducted and some prior art was developed disclosing the following known devices and techniques:

A passive valve is known that is duckbill shaped, used for dispensing fluid with particulates, and included a first body portion having an opening sized to allow the flow of syrup through the opening, and which is increased in size to allow the flow of syrup containing particulates through the opening, so that the larger opening allows the particulate in syrup (such as fruit) to flow out of the first body portion of the valve assembly.

A flexible check valve retention system for drink-container e.g. juice box, is known that includes a snap-fit ring to retain interconnecting flexible check valve and wherein the check valve is designed to dispense liquid, gas, gel, colloid, powder, or particulates.

A self closing valve component for mounting on the end of a tube is known that is made of resilient material, and has a tapered body, a self-closing valve formation, a mouth and fingers that flex outwardly when a pressure of fluid is exerted against their interior surface with its hollow interior chamber. The duckbill dispenser is made of resilient material with multiple elastomeric material panels at outlet, which includes deformable panels deformable to enable adjacent resilient material to flex at preset pressure for enabling outlet to open and which is adapted for use and operation with a viscous fluid such as toothpaste from pliable containers such as tubes and bottles and dispenses liquids, viscous liquids and flowable solids, pastes and creams and the like.

A dispenser valve for a container assembly is known, where a duckbill nozzle dispenses viscous liquids such as liquid soap or the like, and includes a duckbill outlet valve that becomes clogged by the dried residue of the sanitizer, disinfectant, or soap composition or other product that has been dispensed.

A probe tip for inserting into a transfer duckbill valve is known, where a portable duckbill spray device includes the transfer duckbill check valve and a venting check valve which are preferably duckbill valves and wherein the mean diameter of spray particles from the spray nozzle is within the range of about 1 to about 500 mm.

A universal particulate matter delivery device is known having an inlet tube with a duckbill check valve arranged on its discharge end.

A duckbill type check valve is known with curved and resiliently biased closing seal, and include means for pumping slurries containing large solids and which has a flexible wall having sides which form closed geometry which is arcuate in cross-section.

A technique is known related to a method and apparatus for manufacture of duckbill valves, that includes using opposed lips split by applying a high fluid pressure inside the valve, so that the valve supported over outer surface except for end to be split and the valve cannot leak in backward direction.

A fluid product dispenser is known having a duckbill valve, where the dispenser includes a tube wall that opens outside by duckbill valve and is deformed by actuator button that engages tube and compresses discharge channel to expel flowable product.

A nested duckbill valve arrangement is known for insertion into a conduit that are coupled together using a combination of a neck and bead that includes at least two duckbilled check valves nested together and designed so that they can accommodate high pressure and other liquids.

Duckbill check valves and methods of making and using the same are known in which a duckbill check valve is used for dispensing cleaners, fertilizers, herbicides, pesticides, and the like, and includes a body having an inlet at one end and a tapered elastomeric bill formed at an opposite end and which are particularly well suited for dispensing cleaners, fertilizers, herbicides, pesticides from the end of a garden hose.

A combined check and pressure release valve is known, including a valve having a duckbill check valve arranged in relation to a push-button compression spring loaded relief valve actuator. The combined check valve and fluid pressure relief valve includes a duck-bill valve whose lips are sealed by back pressure to become check valve.

A duckbill check valve is known that comprises an outlet whose elastic flat-tapered valve body is adhered with two planes mutually to form plane sealing face, and includes a steel flange placed in valve flange of rubber material.

A beverage container is known having an insert with duckbill valves formed in upper and lower moldings, where the container is for carbonated beverages, and includes the duckbill valves being formed integrally in upper and lower casings of hollow float insert.

A duckbill check valve is known having a support arranged in relation thereto, including a plate having holes and ribs.

None of the known prior art developed in the search included a plastic insert that can be used to strengthen a duckbill valve against back pressure, especially where the insert has a special concave shape with a "W" design, which keeps good support for the main check valve but also allows large particulates to pass through the center.

SUMMARY OF THE INVENTION

The present invention provides new and unique apparatus in the form of a duckbill check valve assembly that is made of two components—a duckbill check valve seat and a duckbill check valve support. The duckbill check valve seat is made of a pliable material, e.g., rubber or synthetic elastomer, and is also known herein as a duckbill valve. The duckbill check valve support takes the form of, e.g., a rigid insert made of, e.g., plastic or some other hard material like metal, either now known or later developed in the future.

In operation, fluid flows through the duckbill check valve assembly and a duckbill portion of the duckbill check valve seat opens to pass the fluid and particulates. When the dispense valve or similar device is closed, the duckbill portion closes and as pressure increases the rigid insert supports the walls of the duckbill check valve seat, so as not to collapse, causing the duckbill check valve assembly to at least partially fail. The unique design of the rigid insert according to the present invention allows for the duckbill portion of the duckbill check valve seat to provide a larger opening for the passing of particulates, and to provide support for higher back pressures (up to 80 PSI) than typical known duckbill check valve designs. The rigid insert also has two (2) raised radially extending locating tabs, wings or protrusions to help locate and maintain the location of the rigid insert within the check valve seat to align the insert in relation to the seat when arranged therein, and to prevent the insert from being pushed out by the back pressure.

According to some embodiments of the present invention, the check valve assembly may take the form of the duckbill check valve seat in combination with the rigid insert in the form of the duckbill check valve support, where the duckbill check valve seat is configured with a flattened end having a slit to open to provide the fluid and particulate, and to close to prevent the backflow of the fluid and particulate, where the insert has a base portion that is configured to arrange the insert inside the duckbill check valve seat, and where the insert has a W-shaped portion configured with an opening to pass the fluid and particulate through to the duckbill check valve seat and also configured to provide support for walls of the flattened end of the duckbill check valve seat in response to a back pressure caused by the fluid and particulate.

According to some embodiments of the present invention, the W-shaped portion may include two end supporting arms and two raised opposing intermediate supporting arms configured to form the opening to pass the fluid and particulate through the duckbill check valve support to the duckbill check valve seat and to provide support for walls of the duckbill check valve seat in response to a back pressure caused by the fluid and particulate, including back pressures up to about 80 PSI.

According to some embodiments of the present invention, the duckbill check valve support may include two locating tabs or wings, and the base portion of the duckbill check valve seat may include two locating recesses arranged in its internal walls and configured to receive the two locating tabs or wings in order to axially align the duckbill check valve seat in relation to the duckbill check valve support in a proper orientation and at a proper depth, as well as to prevent the duckbill check valve support from being pushed out of the duckbill check valve seat due to back pressure.

According to some embodiments of the present invention, the insert may be made of a rigid plastic or other suitable rigid material, and the duckbill valve may be made of a pliable material like rubber or a synthetic elastomer either now known or later developed in the future.

The apparatus according to the present invention may also take the form of the insert itself for inserting into a duckbill check valve support featuring one or more of the features described above.

In effect, according to the present invention the rigid insert can be used to strengthen a duckbill check valve seat against back pressure, far in excess of 20 PSI. The insert has a new and unique concave shape with a "W" design, which keeps good support for the main check valve but also allows large particulates to pass through the center.

BRIEF DESCRIPTION OF THE DRAWING

The drawing, which are not necessarily drawn to scale, includes the following Figures:

FIG. 1a is an exploded view of a duckbill check valve assembly according to some embodiments of the present invention.

FIG. 1b is a view of cross-section of a duckbill check valve assembly according to some embodiments of the present invention.

FIG. 2a is a top perspective view of a duckbill check valve support that forms part of the duckbill check valve assembly shown in FIGS. 1a and 1b.

FIG. 2b is a view of cross-section of the duckbill check valve support shown in FIG. 2a.

FIG. 2c is a bottom view of the duckbill check valve support shown in FIGS. 2a.

FIG. 2d is a top view of a duckbill check valve support that forms part of the duckbill check valve assembly shown in FIGS. 1a and 1b.

FIG. 2e is a section view along A-A of the duckbill check valve support shown in FIG. 2d.

FIG. 2f is a section view along B-B of the duckbill check valve support shown in FIG. 2d.

FIG. 2g is a side view along B-B of the duckbill check valve support shown in FIG. 2d.

FIG. 2h is a side perspective view of the duckbill check valve support shown in FIG. 2d FIG. 2i is a side view along A-A of the duckbill check valve support shown in FIG. 2d.

FIG. 3a is a top view of a duckbill check valve seat that forms part of the duckbill check valve assembly shown in FIGS. 1a and 1b.

FIG. 3b is a section view along A-A of the duckbill check valve seal shown in FIG. 3a.

FIG. 3c is a section view along B-B of the duckbill check valve seal shown in FIG. 3a.

FIG. 3d is a section view along C-C of the duckbill check valve seal shown in FIG. 3b.

FIG. 3e is a detailed view of portion D of the duckbill check valve seat shown in FIG. 3b.

FIG. 3f is a detailed view of portion E of the duckbill check valve seat shown in FIG. 3b.

FIG. 3g is a side view along A-A of the duckbill check valve seat shown in FIG. 3a.

FIG. 3h is a side view along B-B of the duckbill check valve seat shown in FIG. 3a.

FIG. 3i is a side perspective view of the duckbill check valve seat shown in FIG. 3a.

FIG. 3j is a bottom view of the duckbill check valve seat shown in FIG. 3a.

DETAILED DESCRIPTION OF THE INVENTION

The Duckbill Check Valve Assembly 10

Figure 2J:
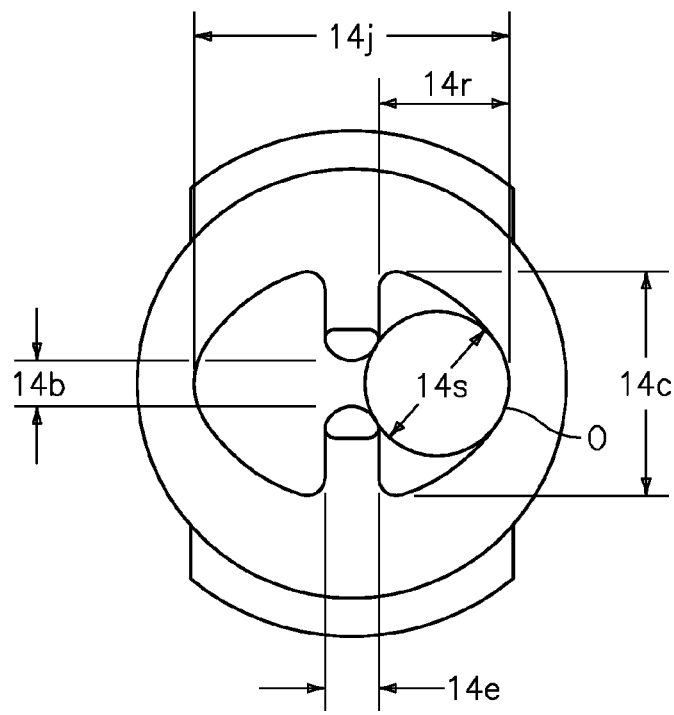
FIG. 2j is a diagram of a top view of a duckbill check valve support that forms part of the duckbill check valve assembly shown in FIGS. 1a and 1b.

FIGS. 1a and 1b show a duckbill check valve assembly generally indicated as 10 according to some embodiments of the present invention, which includes a duckbill valve in the form of a duckbill check valve seat 12 (see FIGS. 3a through 3j) and an insert for arranging inside in the form of a duckbill check valve support 14 (see FIGS. 2a through 2j).

The Duckbill Check Valve Seat 12

The following description of duckbill check valve seat 12 is provided by way of example. The scope of the invention is intended to include deviations from that shown and description so as to still be within the spirit of the invention.

As shown in FIGS. 1a and 1b, the duckbill check valve seat 12 is made of pliable material, shaped like the beak of a duck, and configured with a duckbill portion 16 and a base portion 18. The duckbill portion 16 is configured with a flattened end 20 having a slit 22 to flex open so as to allow and provide fluid and particulate to pass through, and to close to prevent the backflow of the fluid and particulate. For example, in operation when a fluid is pumped through the duckbill portion 16, the flattened end 20 opens to permit the pressurized fluid to pass; and when internal pressure is removed, the duckbill end 20 returns to its flattened shape, closing the slit 22, thus preventing backflow. The base portion 18 is configured with an external circumferential protruding portion 18a, shown by way of example, as a sealing ring or bead, for coupling duckbill check valve seat 12 to another device, such as a supply line or pump (not shown) that provides fluid and particulate. The base portion 18 is also configured on both sides with internal recesses 18b and 18c in its internal or interior wall 18d that forms an internal cavity of the base portion 18 of the duckbill check valve seat 12.

The base portion 18 is also configured with an inwardly extending sealing portion 18e having an annular ledge 18f for providing support for the duckbill check valve support 14 once inserted therein for helping to prevent it from being displaced from the fluidic backpressure. The base portion 18 is also configured with a chamfered rim 38 shown as about 45° to facilitate the insertion of the duckbill check valve support 14 therein, as best shown in FIGS. 3b, 3c.

By way of example, the duckbill check valve seat 12 is shown in further detail in FIG. 3a through 3j, where features of the duckbill check valve seat 12 are labeled using the reference numeral of FIGS. 1a, 1b. To improve readability of the application in relation to that shown in FIG. 3a through 3j, and to reduce the overcrowding of unnecessary and redundant lead lines, some features shown in FIGS. 1a, 1b are not labeled in one or more of the FIG. 3a through 3j.

Reference labels 12a (FIG. 3a) through 12hh (FIG. 3h) identify various dimensions that a person skilled in the art can be used to construct the duckbill check valve seat 12, based on the particular application. A person skilled in the art would be able to generate a particular set of dimensions to construct the duckbill check valve seat 12 with undue experimentation, including by generating the set of dimensions by hand calculation or by using a computer aided design program or the like either now known or later developed in the future. The scope of the invention is not intended to be limited to any particular application, any particular set of dimensions used in relation to any particular application, or the manner in which the set of dimensions is generated in relation to any particular application.

The Insert or Duckbill Check Valve Support 14

The following description of the insert 14 is provided by way of example. The scope of the invention is intended to include deviations from that shown and description so as to still be within the spirit of the invention.

As shown in FIGS. 1a and 1b, the insert 14 has a base portion 30 that is configured to arrange the insert 14 inside the duckbill check valve seat 12, and has a W-shaped portion generally indicated as 32 configured with an opening 34 to pass the fluid and particulate through the duckbill check valve support 14 to the duckbill check valve seat 12, and also configured to provide support for walls 16a, 16b of the duckbilled portion 16 of the duckbill check valve seat 12 in response to a back pressure caused by the fluid and particulate. The insert 14 also has an internal wall 36 forming an internal cavity so as to pass the fluid and particulate through and out the opening 34.

The W-shaped portion 32 may include two end supporting arms 32a, 32d and two raised opposing intermediate supporting arms 32b, 32c that are configured to form the opening 34 to pass the fluid and particulate through the duckbill check valve support 14 to the duckbill check valve seat 12 and also to provide support for the walls 16a, 16b of the duckbill check valve seat 12 in response to a back pressure caused by the fluid and particulate, including back pressures up to about 80 PSI. The support arm 32a has two side portions $32a_1$ and $32a_2$; the support arms 32b, 32c have respective side portions $32b_1$ and $32c_1$; and the support arm 32d has two side portions $32d_1$ and $32d_2$. The side portions $32a_1$ and $32a_2$; $32b_1$ and $32c_1$; and $32d_1$ and $32d_2$ respectively contact and support the walls 16a, 16b of the duckbilled portion 16 of the duckbill check valve seat 12 in response to the back pressure caused by the fluid and particulate. The support arm 32a has two curved portions $32a_3$ and $32a_4$, and the support arm 32d has two curved portions $32d_3$ and $32d_4$, so that the walls 16a, 16b of the duckbilled portion 16 of the duckbill check valve seat 12 are not resting on edges to minimize wear. The W-shaped portion 32 also includes curved portions 33a, 33b, 33c, 33d that extend respectively between the support arms 32a, 32b, 32c, 32d and that are configured to form the opening 34 to pass the fluid and particulate through the duckbill check valve support to the duckbill check valve seat 12. The support arm 32b is configured with a strengthening rib or portion $32b_2$ (see FIG. 2b) extending along the wall 36 for providing additional strength. The support arm 32c is configured with a similar strengthening rib or portion $32c_2$ (see FIG. 2c) extending along the wall 36 for providing additional strength. In FIG. 2b, the reference label 32' points to the underside of the W-shaped portion 32 shown, e.g., in FIGS. 2a.

The base portion 30 is also configured with a pair of locating tabs or wings 30a, 30b protruding from both sides thereof for being received in, arranged in relation to, and cooperating with the internal recesses 18b and 18c in the internal or interior wall 18d of the duckbill check valve seat 12, so as to provide axial alignment and the proper depth when the duckbill check valve support 14 is inserted into the duckbill check valve seat 12, as well as to prevent the insert from being pushed out by the back pressure. As shown, the locating tabs or wings 30a, 30b and the internal recesses 18b and 18c extend partially around the respective circumferential surfaces of the base portion 30 of the duckbill check valve support 14 or the internal or interior wall 18d of the duckbill check valve seat 12.

By way of example, the duckbill check valve support 14 is shown in further detail in FIG. 2a through 2j, where features of the duckbill check valve support 14 are labeled using the reference numeral of FIGS. 1a, 1b. To improve readability of the application in relation to that shown in FIG. 2a through 2j, and to reduce the overcrowding of unnecessary and redundant lead lines, some features shown in FIGS. 1a, 1b are not labeled in one or more of the FIG. 2a through 2i.

Reference labels 14a (FIG. 2a) through 14s (FIG. 2j) identify various dimensions that a person skilled in the art can be used to construct the duckbill check valve support 14, based on the particular application. A person skilled in the art would be able to generate a particular set of dimensioned to construct the duckbill check valve support 14 with undue experimentation, including by generating the set of dimensions by hand calculation or by using a computer aided design program or the like either now known or later developed in the future. The scope of the invention is not intended to be limited to any particular application, any particular set of dimensions used in relation to any particular application, or the manner in which the set of dimensions is generated in relation to any particular application.

One Particular Application

By way of example, in one particular application the duckbill check valve support 14 could be designed to pass particulates, including pulp and seeds, having a size of about 0.161 inches (about 4 millimeters) and may be dimensioned in inches in relation to that shown in FIGS. 2d through 2j as follows:

| Dimension | Figure | Approximate Size (inches) |
|---|---|---|
| 14a | 2d | 0.360 |
| 14b, 14f | 2d, 2e | 0.050 |
| 14c | 2d | 0.235 |
| 14d | 2d | 0.280 |
| 14e | 2d | 0.060 |
| 14g | 2e | 0.296 |
| 14h | 2e | 0.350 |
| 14i | 2e | 0.050 |
| 14j | 2f | 0.350 |
| 14k | 2g: | 0.141 |
| 14l | 2i | 0.475 |
| 14m | 2i | 0.100 |
| 14n | 2i | 0.060 |
| 14o | 2i | 0.120 |
| 14p | 2i | 0.300 |
| 14q | 2i | 0.550 |
| 14r | 2j | 0.147 |
| 14s | 2i | 0.161 |

In this particular application, the duckbill check valve support 14, including the two end supporting arms 32a, 32d, the two raised opposing intermediate supporting arms 32b, 32c, and the curved portions 33a, 33b, 33c, 33d, is dimensioned to form the opening 34 so as to pass large particulates that may be the size of about 0.161 inches (or about 4 millimeters) or more. Because of the relationship between the dimension of the opening 34 and the size of the large particulates that it needs to pass, when the rigid support is inserted in the valve seat, the two end supporting arms 32a, 32d, and the two raised opposing intermediate supporting arms 32b, 32c combine to contact, extend along and support the interior side of the walls 16 that converge so as to form the flattened end 20 of the valve seat 10. The two end supporting arms 32a, 32d, and the two raised opposing intermediate supporting arms 32b, 32c substantially extend along the interior side of the walls 16 to the flattened end 20 of the valve seat 10. In FIG. 2j, the opening O has a diameter of about 0.161 inches that can allow particulate having a dimension of about the same size to pass through. The structural advantage of this design according to the present invention is that it results in the walls 16 of the flattened end 20 of the valve seat 10 being able to sustain their form when being subjected to back pressures as high as 80 PSI, without the duckbill valve failing.

By way of example, in this particular application the duckbill check valve support 14 was designed to cooperate with the duckbill check valve seat 12 dimensioned in inches in relation to that shown in FIGS. 3d through 3j as follows:

| Dimension | Figure | Approximate Size (inches) |
|---|---|---|
| 12a | 3a | 0.060 |
| 12b | 3a | 0.570 |
| 12c | 3b | 0.550 |
| 12d | 3b | 0.250 |
| 12e | 3b | 0.100 |
| 12f | 3b | 0.350 |
| 12g | 3b | 0.475 |
| 12h | 3b | 0.720 |
| 12i | 3b | 0.786 |
| 12j | 3c | 0.475 |
| 12u | 3f: | 0.060 |
| 12v | 3f: | 0.060 |
| 12z | 3f: | 0.002 |

FIG. 4

Figure 4:
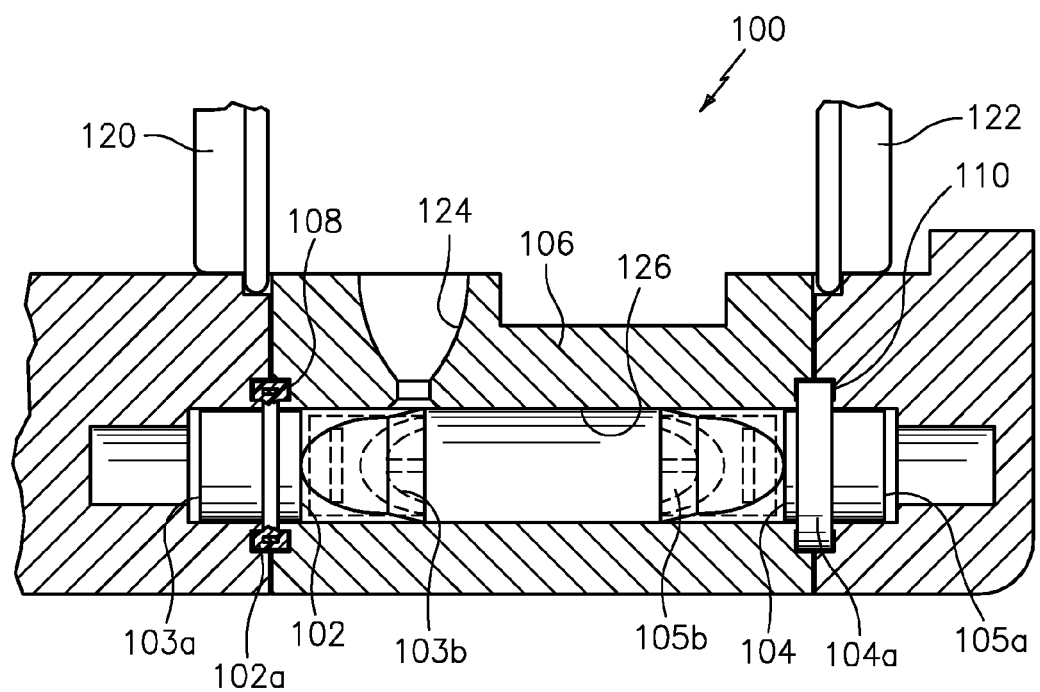
FIG. 4 is a cross-section of part of a pump having two duckbill check valve assemblies according to some embodiments of the present invention.

FIG. 4 is a cross-section of part of a pump generally indicated as 100 having two duckbill check valve assemblies 102, 104 according to some embodiments of the present invention. The pump 100 has a housing 106 with two circumferential grooves 108, 110. Each duckbill check valve assemblies 102, 104 has its external circumferential protruding portion 102a, 104a (i.e. sealing ring or bead) arranged in a respective circumferential groove 108, 110 for holding each duckbill check valve assembly 102, 104 in place in the housing 106. In FIG. 4, the external circumferential protruding portion 102a is shown in cross-section, while the external circumferential protruding portion 104a is not. Moreover, as shown the two duckbill check valve assemblies 102, 104 each includes a seat portion 103a, 105a respectively and a support portion 103b, 105b (in phantom). In operation, the fluid and particulate is pumped alternately through the check valve via the reciprocation of dual diaphragm system 120, 122, passing through channels 124, 126 with the two duckbill check valve assemblies 102, 104 being arranged in the channel 126 as shown. The sealing ring or bead allows the same duckbill check valve assembly 102, 104 to be arranged in either circumferential groove 108, 110, so the same duckbill check valve assembly 102, 104 can be used in both places.

List All Possible Applications

This duckbill valve is suited to passing high viscosity liquids such as condiments or fluids that contain particulates up to 4 mm in diameter. Such applications include condiment, fruit juice, smoothie, milkshake, hand lotion, soaps, shampoos and other viscous materials with particulates that would normally foul typical spring loaded check valves.

By way of example, the duckbill check valve assembly according to the present invention may be configured to form part of a pump capable of handling solids pertaining to mixes used for making smoothies for various customers developing crew served smoothie machines, including for use with acidic juices or non dairy.

Testing

By way of example, the duckbill check valve assembly according to the present invention has undergone performance and life testing, including the following:

1. Performance Testing

A. Static Leak test—Test G58E, at 30 PSI and 50 PSI for 1 hour
   The units passed the static leak test at the stated pressures.
   The units have been under a dwell leak test per the Life testing section C below for 1300 hours with 60 PSI back pressure.
   2 units were tested at 80 PSI for 20 hours with no leaks.
B. Flow curves—G58E: Test with Water, repeat with Strawberry Smoothie Mix (open flow only)
   At 30 PSI with water the open flow was 1.9 GPM; At 50 PSI the open flow was 2.35 GPM. This is comparable or higher then the existing pumps at these pressures.
   At 30 PSI with smoothie mix the open flow was 0.86 GPM; At 50 PSI smoothie mix open flow was 0.78 GPM.
C. Vacuum Shut Off—Close inlet valve and record inlet vacuum at each air inlet pressure of 30 and 50 psi
   Vacuum analysis was performed and found that under normal conditions using the Strawberry smoothie mix, the vacuum was approx. 11.5 inHg. This was fairly close to our G58 (14-19 inHg) ASO range so the ASO was changed to the regular range of 19-23 inHg. This prevents any nuisance cycling of the ASO device inhibiting the function of the pump.

2. Life Testing: (REF: LTR S09-027, S09-047, S09-065)

A. Cycle Life Test (Strawberry Smoothie Mix)—Target Life: Minimum 15K gallons; allow units to run to 50K gallons or failure
   Units exceeded the 15K minimum requirement. Current Gallons are Approx 37K. Units will continue to run until failure or 50K gallons.
B. Cycle Life Test (Water)—Target Life: Minimum 15K gallons; allow units to run to 50K gallons or failure
   Units exceeded the 15K minimum requirement. Current Gallons are Approx 100K. Units will continue to run until failure or space needed for other testing.
C. Endurance Life Test for Dwell Time (Strawberry Smoothie Mix)—Target Life:
   Target 5000 hours of Dwell; run test until failure
   The unit has reached a dwell time of approx 1300 hours. The team is confident that this time is a sufficient criterion. The dwell time was based upon the expectation that the smoothie machines would be left at pressure in between shifts and cleanings etc. . . . . Some customers to date are leaving air pressure supplied constantly on the pump. Some customers are using solenoids to supply air on demand versus leaving the system charged.
   The pumps will continue on the test until the allotted time is reached or until test space is needed.

The Scope of the Invention

Further still, the embodiments shown and described in detail herein are provided by way of example only; and the scope of the invention is not intended to be limited to the particular configurations, dimensionalities, and/or design details of these parts or elements included herein. In other words, a person skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. A check valve assembly comprising:
   a duckbill check valve seat configured with an end having a slit to open to provide a fluid and particulate, and to close to prevent the backflow of the fluid and particulate; and
   a duckbill check valve support having a base portion configured to be inserted inside the duckbill check valve seat, and having a W-shaped portion configured with an opening to pass the fluid and particulate through the duckbill check valve support to the duckbill check valve seat and also configured to provide support for walls of the duckbill check valve seat in response to back pressure caused by the fluid and particulate,
   the W-shaped portion including two end supporting arms and two raised intermediate supporting arms configured to form the opening to pass the fluid and particulate through the duckbill check valve support to the duckbill check valve seat and provide support for walls of the duckbill check valve seat in response to back pressure caused by the fluid and particulate, including backpressure up to about 80 PSI.

2. A check valve assembly according to claim 1, wherein the W-shaped portion is configured with outer walls to support walls of the end of the duckbill check valve seat.

3. A check valve assembly according to claim 1, wherein the duckbill check valve support includes two locating tabs or wings, and the base portion of the duckbill check valve seat includes two locating recesses arranged in its internal walls and configured to receive the two locating tabs or wings in order to axially align the duckbill check valve seat in relation to the duckbill check valve support in a proper orientation and at a proper depth, as well as to prevent the duckbill check valve support from being pushed out of the duckbill check valve seat due to back pressure.

4. A check valve assembly according to claim 1, wherein the duckbill check valve support is made of metal or plastic, the duckbill check valve seat is made of a pliable material, including rubber or a synthetic elastomeric material, or the combination thereof.

5. A check valve assembly according to claim 1, wherein the base portion is configured with an external circumferential protruding portion for coupling the duckbill check valve seat to another device, including supply line or pump (not shown) that provides fluid and particulate.

6. A check valve assembly according to claim 5, wherein the external circumferential protruding portion takes the form of a sealing ring or bead.

7. A check valve assembly according to claim 1, wherein the duckbill check valve seat has a base portion configured with an inwardly extending sealing portion having an annular ledge for supporting for the duckbill check valve support once inserted therein for preventing it from being displaced from the fluidic back pressure.

8. A check valve assembly according to claim 1, wherein the W-shaped portion includes four curved portions, each curved portion extending respectively between each of the two end support arms and a respective one of the two raised intermediate supporting arms, each being configured to form the opening to pass the fluid and particulate through the duckbill check valve support to the duckbill check valve seat.

9. A check valve assembly according to claim 1, wherein each of the two raised intermediate support arms is configured with a respective strengthening rib or portion extending along a respective wall for providing additional strength.

10. A duckbill check valve support for inserting into a duckbill check valve seat configured with an end having a slit to open to provide a fluid and particulate, and to close to prevent the backflow of the fluid and particulate, the duckbill check valve support comprising:
a base portion configured to arrange the duckbill check valve support inside the duckbill check valve seat; and
a W-shaped portion configured with an opening to pass the fluid and particulate through the duckbill check valve support and also configured to provide support for walls of the duckbill check valve seat in response to back pressure caused by the fluid and particulate,
the W-shaped portion including two end supporting arms and two raised intermediate supporting arms configured to form the opening to pass the fluid and particulate through the duckbill check valve support to the duckbill check valve seat and provide support for walls of the duckbill check valve seat in response to back pressure caused by the fluid and particulate, including back pressure up to about 80 PSI.

11. A duckbill check valve support according to claim 10, wherein the W-shaped portion is configured with outer walls to support for the walls of the end of the duckbill check valve seat.

12. A duckbill check valve support according to claim 10, wherein the duckbill check valve support includes two locating tabs or wings configured to be received by two locating recesses formed in internal walls of the duckbill check valve seat in order to axially align the duckbill check valve seat in relation to the duckbill check valve support in a proper orientation and at a proper depth, as well as to prevent the duckbill check valve support from being pushed out of the duckbill check valve seat due to back pressure.

13. A duckbill check valve support according to claim 10, wherein the duckbill check valve seat is made of plastic or metal, the duckbill check valve support is made of rubber or a synthetic elastomeric material, or the combination thereof.

14. A duckbill check valve support according to claim 10, wherein the W-shaped portion includes four curved portions, each curved portion extending respectively between each of the two end support arms and a respective one of the two raised intermediate supporting arms, each being configured to form the opening to pass the fluid and particulate through the duckbill check valve support to the duckbill check valve seat.

15. A duckbill check valve support according to claim 10, wherein each of the two raised intermediate support arms is configured with a respective strengthening rib or portion extending along a respective wall for providing additional strength.

16. A check valve assembly comprising:
a duckbill valve configured to provide fluid and particulate; and
an insert having a base portion configured to seat the insert inside the duckbill valve, and a W-shaped portion configured with an opening to pass the fluid and particulate through the duckbill valve and also configured to provide support for walls of the duckbill valve in response to back pressure caused by the fluid and particulate,
the W-shaped portion including two end supporting arms and two raised intermediate supporting arms configured to form the opening to pass the fluid and particulate through the duckbill check valve support to the duckbill check valve seat and provide support for walls of the duckbill check valve seat in response to back pressure caused by the fluid and particulate, including back pressure up to about 80 PSI.

17. A check valve assembly according to claim 16, wherein the W-shaped portion is configured with outer walls to support the walls of the duckbill valve.

18. A check valve assembly according to claim 16, wherein the insert includes two locating tabs or wings configured to be received by two locating recesses formed in internal walls of the duckbill valve in order to axially align the duckbill valve in relation to the insert in a proper orientation and at a proper depth, as well as to prevent the duckbill check valve support from being pushed out of the duckbill check valve seat due to back pressure.

19. A check valve assembly according to claim 16, wherein the duckbill check valve seat has a base portion configured with an inwardly extending sealing portion having an annular ledge for supporting for the duckbill check valve support once inserted therein for preventing it from being displaced from the fluidic back pressure.

20. A check valve assembly according to claim 16, wherein the W-shaped portion includes four curved portions, each curved portion extending respectively between each of the two end support arms and a respective one of the two raised intermediate supporting arms, each being configured to form the opening to pass the fluid and particulate through the duckbill check valve support to the duckbill check valve seat.

* * * * *